United States Patent
Biskeborn et al.

(10) Patent No.: US 10,109,310 B2
(45) Date of Patent: Oct. 23, 2018

(54) TAPE HEAD HAVING SUB-AMBIENT CHANNEL AND METHODS OF MANUFACTURE

(71) Applicant: International Business Machines Corporation, Armonk, NY (US)

(72) Inventors: Robert G. Biskeborn, Hollister, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/467,906

(22) Filed: Mar. 23, 2017

(65) Prior Publication Data

US 2018/0277152 A1    Sep. 27, 2018

(51) Int. Cl.
G11B 5/187 (2006.01)
G11B 15/60 (2006.01)
G11B 5/39 (2006.01)
G11B 5/008 (2006.01)
G11B 5/29 (2006.01)
G11B 5/40 (2006.01)

(52) U.S. Cl.
CPC ........ G11B 15/605 (2013.01); G11B 5/00813 (2013.01); G11B 5/00817 (2013.01); G11B 5/1871 (2013.01); G11B 5/29 (2013.01); G11B 5/295 (2013.01); G11B 5/3948 (2013.01); G11B 5/40 (2013.01)

(58) Field of Classification Search
CPC ..... G11B 5/00813; G11B 5/1871; G11B 5/29; G11B 5/295; G11B 5/40
USPC ........................................ 360/121, 122, 316
See application file for complete search history.

(56) References Cited

U.S. PATENT DOCUMENTS

| | | | | |
|---|---|---|---|---|
| 6,118,626 A * | 9/2000 | Muftu | ..................... | G11B 15/62 360/122 |
| 6,433,959 B1 * | 8/2002 | Lakshmikumaran | .... | G11B 5/10 360/122 |
| 6,937,435 B2 * | 8/2005 | Saliba | ..................... | G11B 5/102 29/603.12 |
| 7,006,329 B2 * | 2/2006 | Johnson | ............... | G11B 5/1871 360/221 |

(Continued)

OTHER PUBLICATIONS

Engelen et al., "A Non-Skiving Tape Head with Sub-Ambient Air Pressure Cavities," 2015 IEEE Magnetics Conference (INTERMAG), IEEE, 2015, pp. 1.

(Continued)

*Primary Examiner* — Jefferson Evans
(74) *Attorney, Agent, or Firm* — Zilka-Kotab, P.C.

(57) ABSTRACT

An apparatus according to one embodiment includes a module having a tape bearing surface, an array of magnetic transducers, and a channel in the tape bearing surface. The channel has a longitudinal axis oriented about parallel to a longitudinal axis of the array of magnetic transducers for inducing tenting of a moving magnetic recording tape above the array of magnetic transducers. A method according to one embodiment includes forming a channel in a tape bearing surface of a module. The channel is formed to have a longitudinal axis about parallel to a longitudinal axis of an array of magnetic transducers. The channel is formed proximate to the array of magnetic transducers for inducing tenting of a moving magnetic recording tape above the array of magnetic transducers.

17 Claims, 14 Drawing Sheets

(56) References Cited

U.S. PATENT DOCUMENTS

| | | | |
|---|---|---|---|
| 7,248,438 B2* | 7/2007 | Biskeborn | G11B 5/00826 360/129 |
| 7,271,983 B2* | 9/2007 | Saliba | G11B 5/00817 29/603.07 |
| 7,450,341 B2* | 11/2008 | Dugas | G11B 5/3103 360/121 |
| 7,751,154 B2* | 7/2010 | Wu | G11B 5/3166 360/313 |
| 8,373,944 B2 | 2/2013 | Biskeborn | |
| 8,542,460 B2* | 9/2013 | Biskeborn | G11B 5/1871 360/121 |
| 8,679,733 B2* | 3/2014 | Biskeborn | G03F 1/54 430/320 |
| 9,001,464 B2* | 4/2015 | Lakshmikumaran | G11B 5/008 360/122 |
| 9,299,368 B2 | 3/2016 | Biskeborn et al. | |
| 2007/0183091 A1* | 8/2007 | Saliba | G11B 5/00826 360/122 |
| 2008/0170328 A1* | 7/2008 | Kawakami | G11B 5/00821 360/122 |
| 2009/0231757 A1* | 9/2009 | Biskeborn | G11B 5/1871 360/221 |
| 2010/0196739 A1* | 8/2010 | Hachisuka | G11B 5/0083 428/816 |
| 2011/0043940 A1* | 2/2011 | Wagner | G11B 5/0245 360/57 |
| 2016/0055867 A1* | 2/2016 | Engelen | G11B 5/255 360/125.72 |

OTHER PUBLICATIONS

Engelen et al., "Flat-Profile Tape-Head Friction and Magnetic Spacing," IEEE Transactions on Magnetics, vol. 50, No. 3, 2014, pp. 34-39.

* cited by examiner

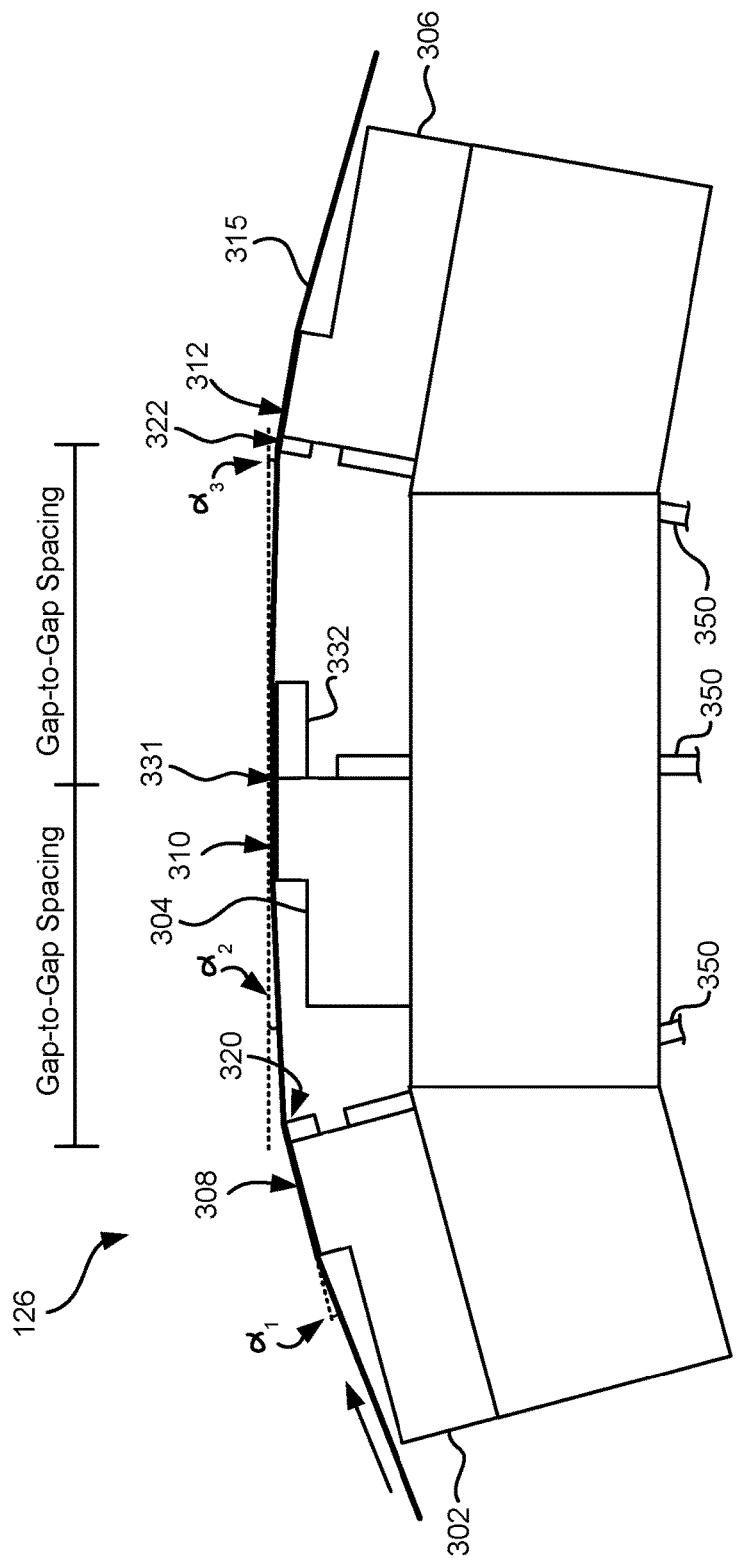

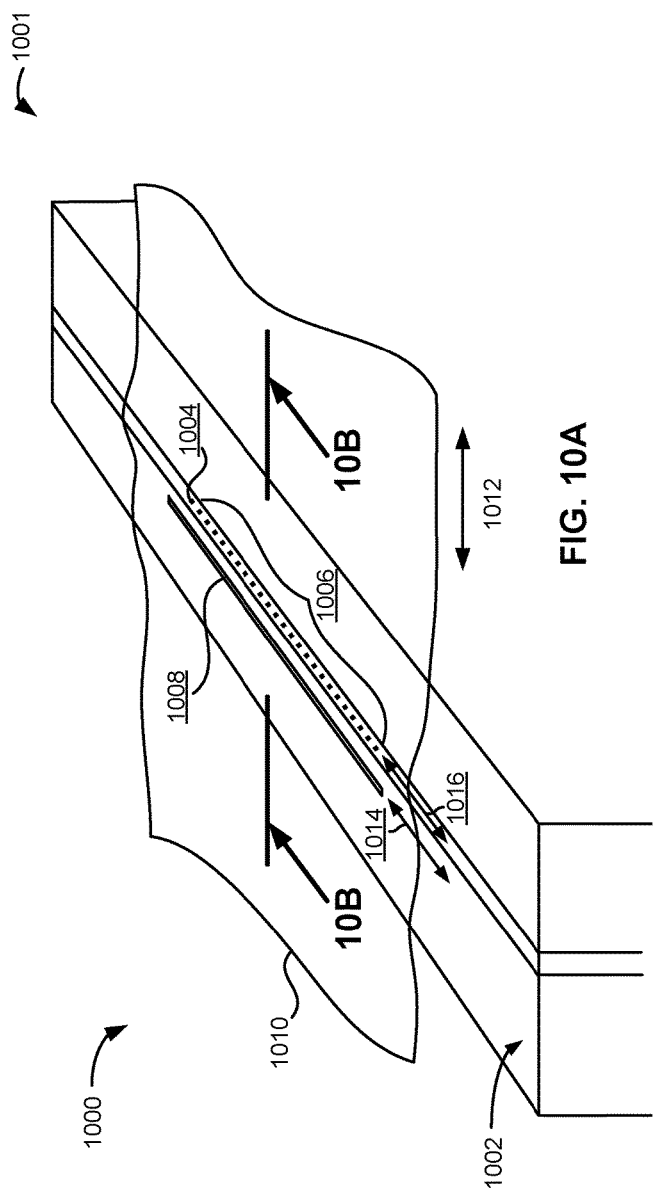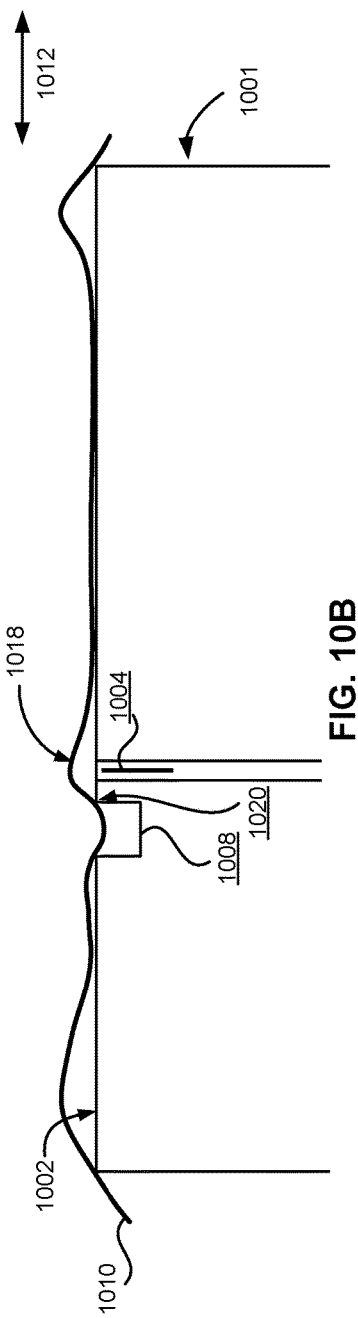

TAPE HEAD HAVING SUB-AMBIENT CHANNEL AND METHODS OF MANUFACTURE

BACKGROUND

The present invention relates to data storage systems, and more particularly, this invention relates to magnetic tape heads.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a module having a tape bearing surface, an array of magnetic transducers, and a channel in the tape bearing surface. The channel has a longitudinal axis oriented about parallel to a longitudinal axis of the array of magnetic transducers for inducing tenting of a moving magnetic recording tape above the array of magnetic transducers.

An apparatus according to another embodiment includes a module having a tape bearing surface and an array of magnetic transducers. A first channel having a longitudinal axis oriented about parallel to a longitudinal axis of the array of magnetic transducers is present for inducing tenting of a moving magnetic recording tape above the array of magnetic transducers. A second channel having a longitudinal axis oriented about parallel to a longitudinal axis of the array of magnetic transducers is present for inducing tenting of a moving magnetic recording tape above the array of magnetic transducers. The first channel and the second channel are positioned on opposite sides of the array of magnetic transducers.

A method according to one embodiment includes forming a channel in a tape bearing surface of a module. The channel is formed to have a longitudinal axis about parallel to a longitudinal axis of an array of magnetic transducers. The channel is formed proximate to the array of magnetic transducers for inducing tenting of a moving magnetic recording tape above the array of magnetic transducers.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is a side view of a magnetic tape head with three modules in an overwrap configuration.

FIG. 10A is a perspective view of a magnetic tape head according to one embodiment.

FIG. 10B is a cross sectional view of the magnetic tape head of FIG. 10A taken along line 10B-10B of FIG. 10A.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a module having a tape bearing surface, an array of magnetic transducers, and a channel in the tape bearing surface. The channel has a longitudinal axis oriented about parallel to a longitudinal axis of the array of magnetic transducers for inducing tenting of a moving magnetic recording tape above the array of magnetic transducers.

In another general embodiment, an apparatus includes a module having a tape bearing surface and an array of magnetic transducers. A first channel having a longitudinal axis oriented about parallel to a longitudinal axis of the array of magnetic transducers is present for inducing tenting of a moving magnetic recording tape above the array of magnetic transducers. A second channel having a longitudinal axis oriented about parallel to a longitudinal axis of the array of magnetic transducers is present for inducing tenting of a moving magnetic recording tape above the array of magnetic transducers. The first channel and the second channel are positioned on opposite sides of the array of magnetic transducers.

In another general embodiment, a method includes forming a channel in a tape bearing surface of a module. The channel is formed to have a longitudinal axis about parallel to a longitudinal axis of an array of magnetic transducers. The channel is formed proximate to the array of magnetic transducers for inducing tenting of a moving magnetic recording tape above the array of magnetic transducers.

Figure 1A:
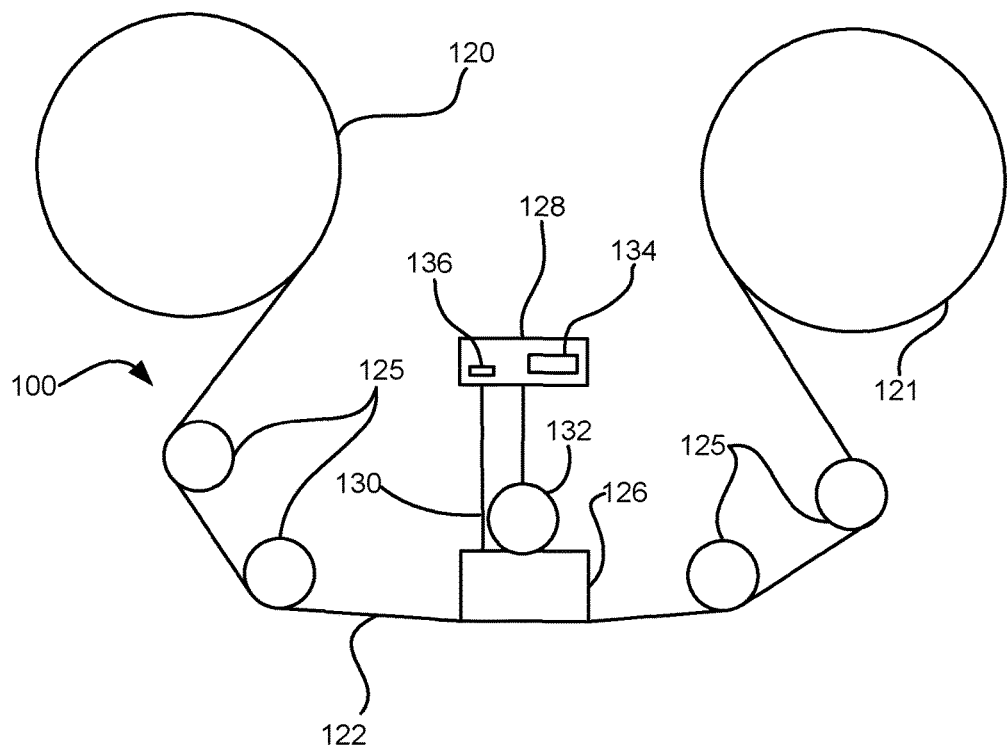
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
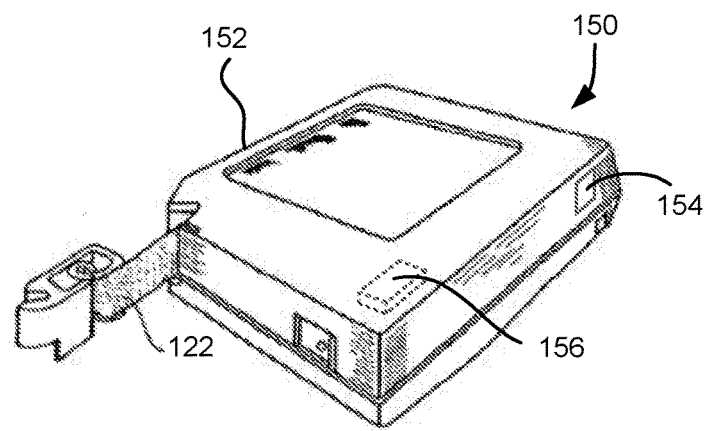
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or another device.

Figure 2A:
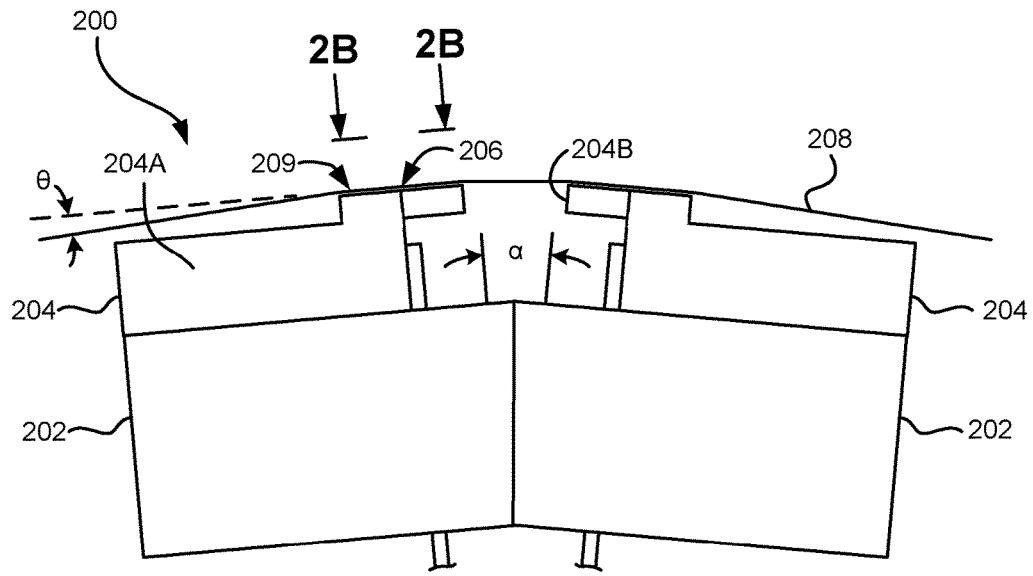
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
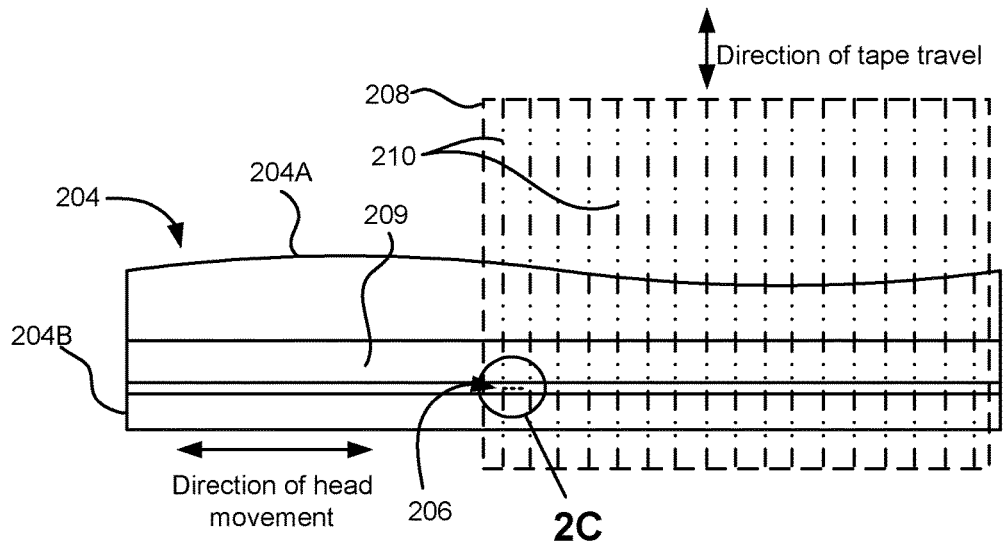
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
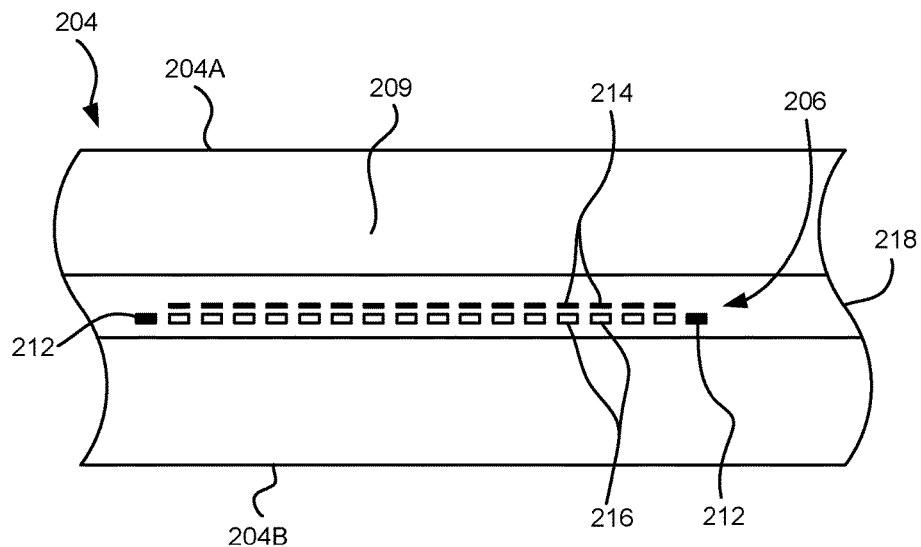
FIG. 2C is a detailed view taken from Circle 2C of FIG. 2B.

FIG. 2C depicts a plurality of readers and/or writers 206 formed in a gap 218 on the module 204 in Circle 2B of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
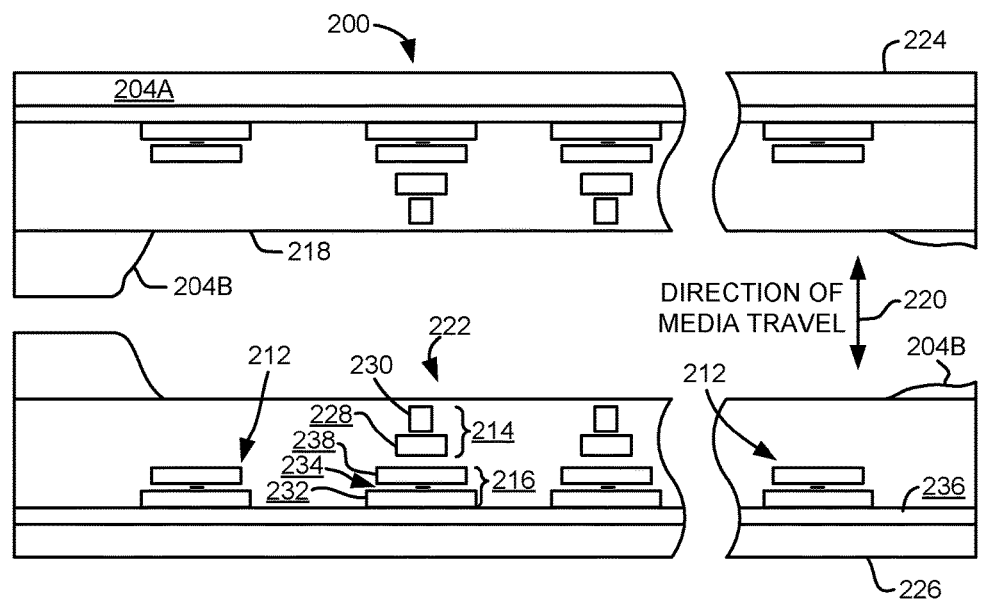
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
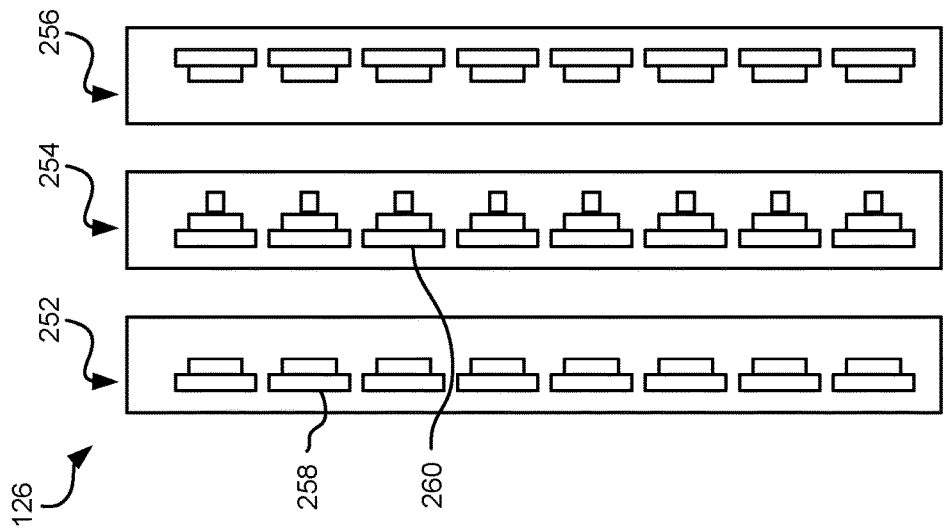
FIG. 4 is a partial tape bearing surface view of a magnetic head having a read-write-read configuration.
Figure 3:
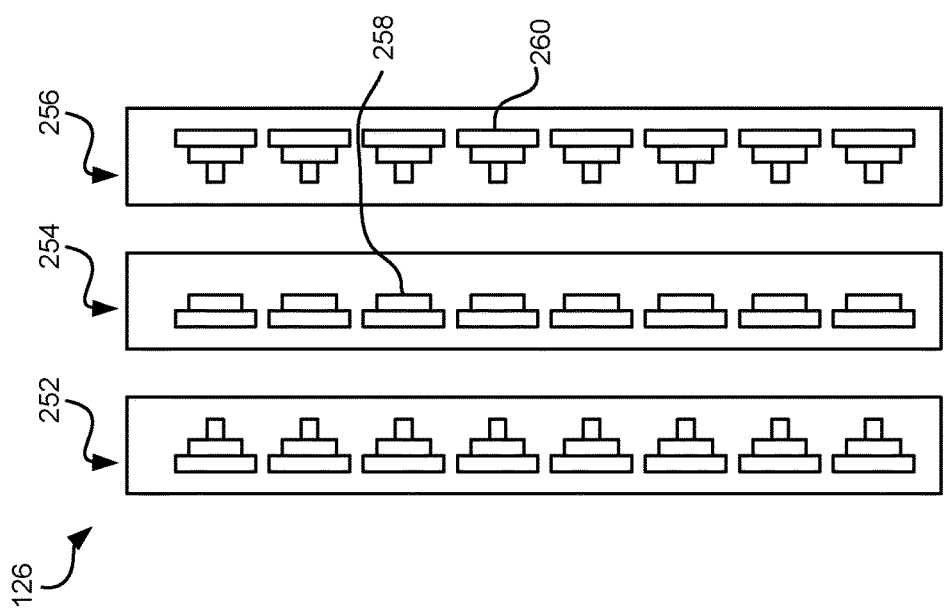
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
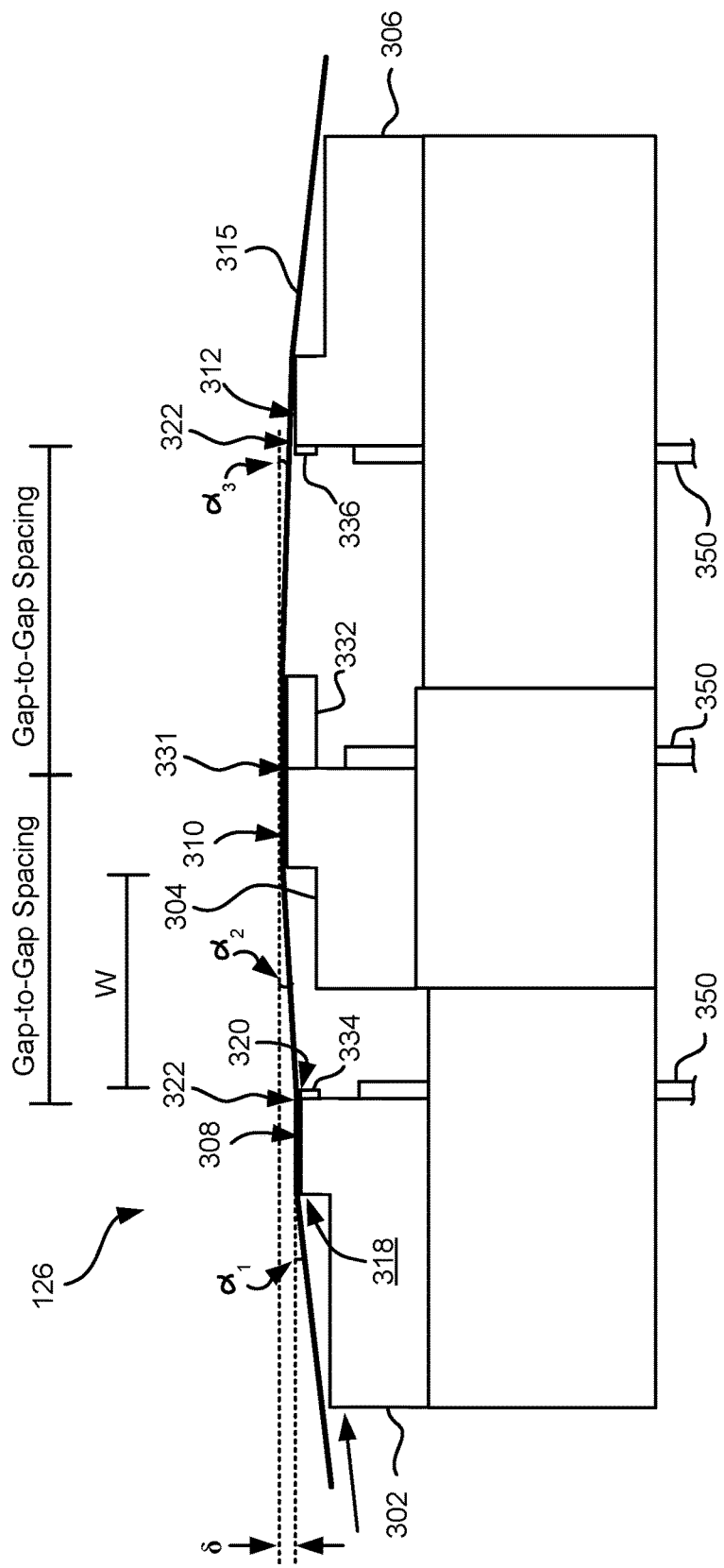
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
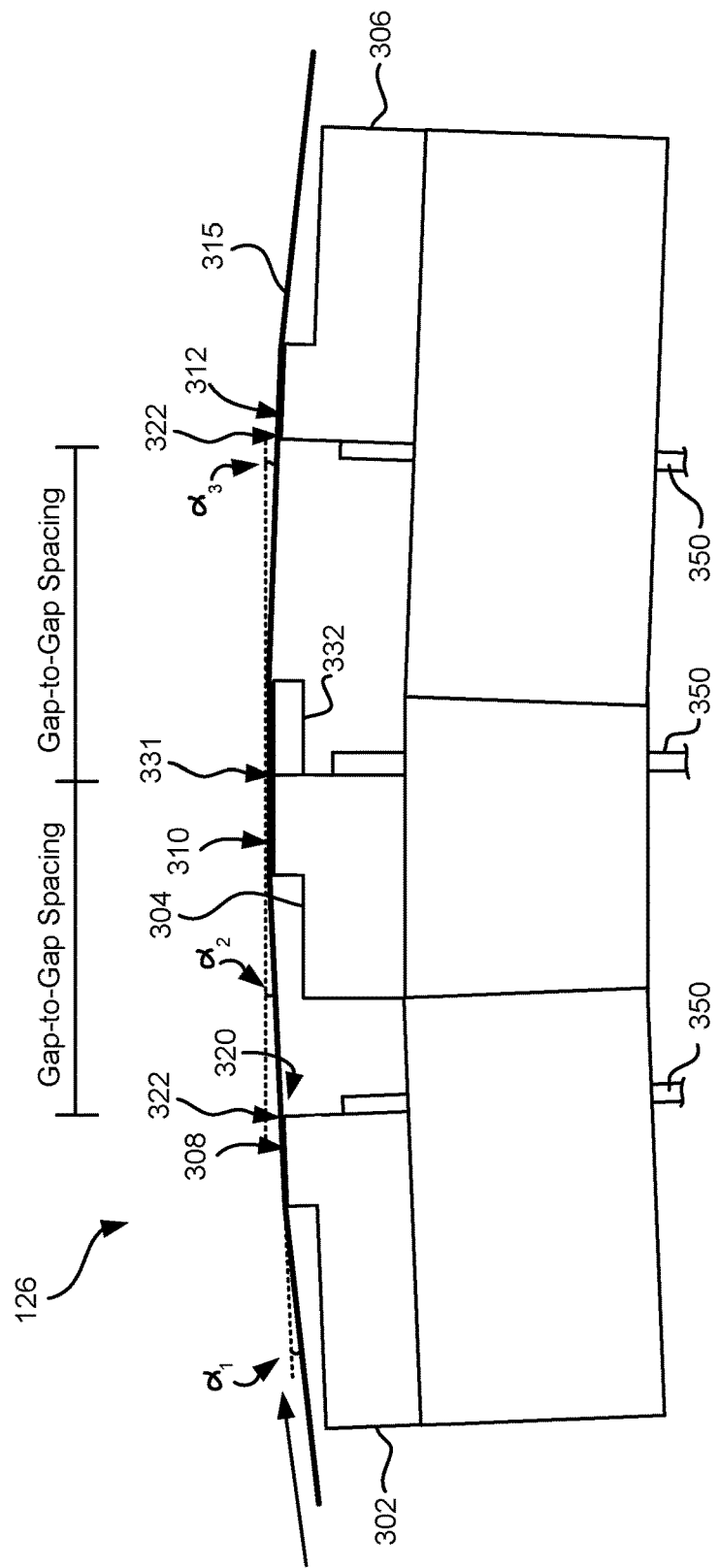
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
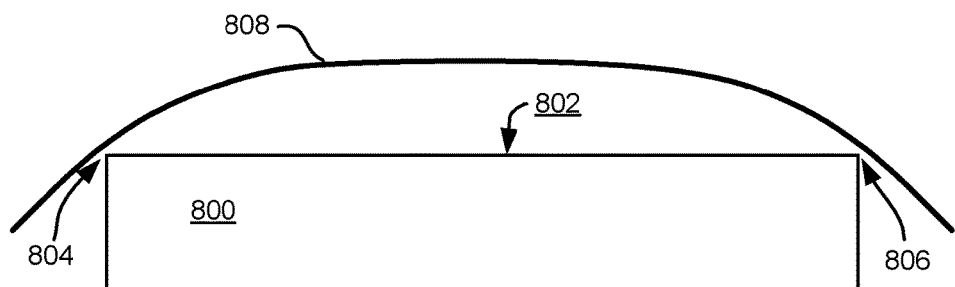
FIGS. 8A-8C are schematics depicting the principles of tape tenting.
Figure 8B:
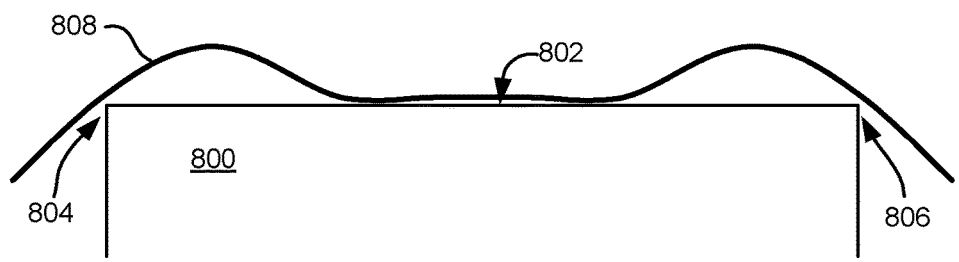
Figure 8C:
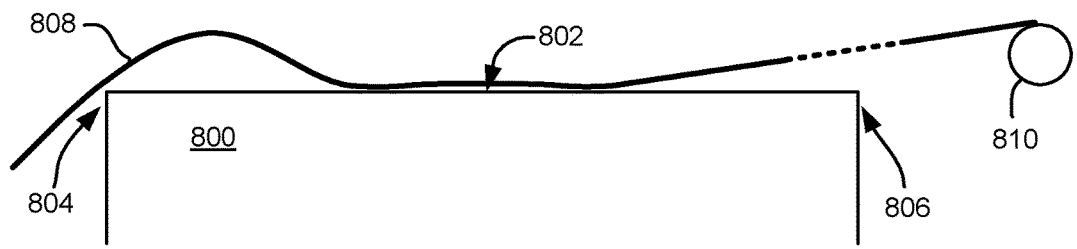

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
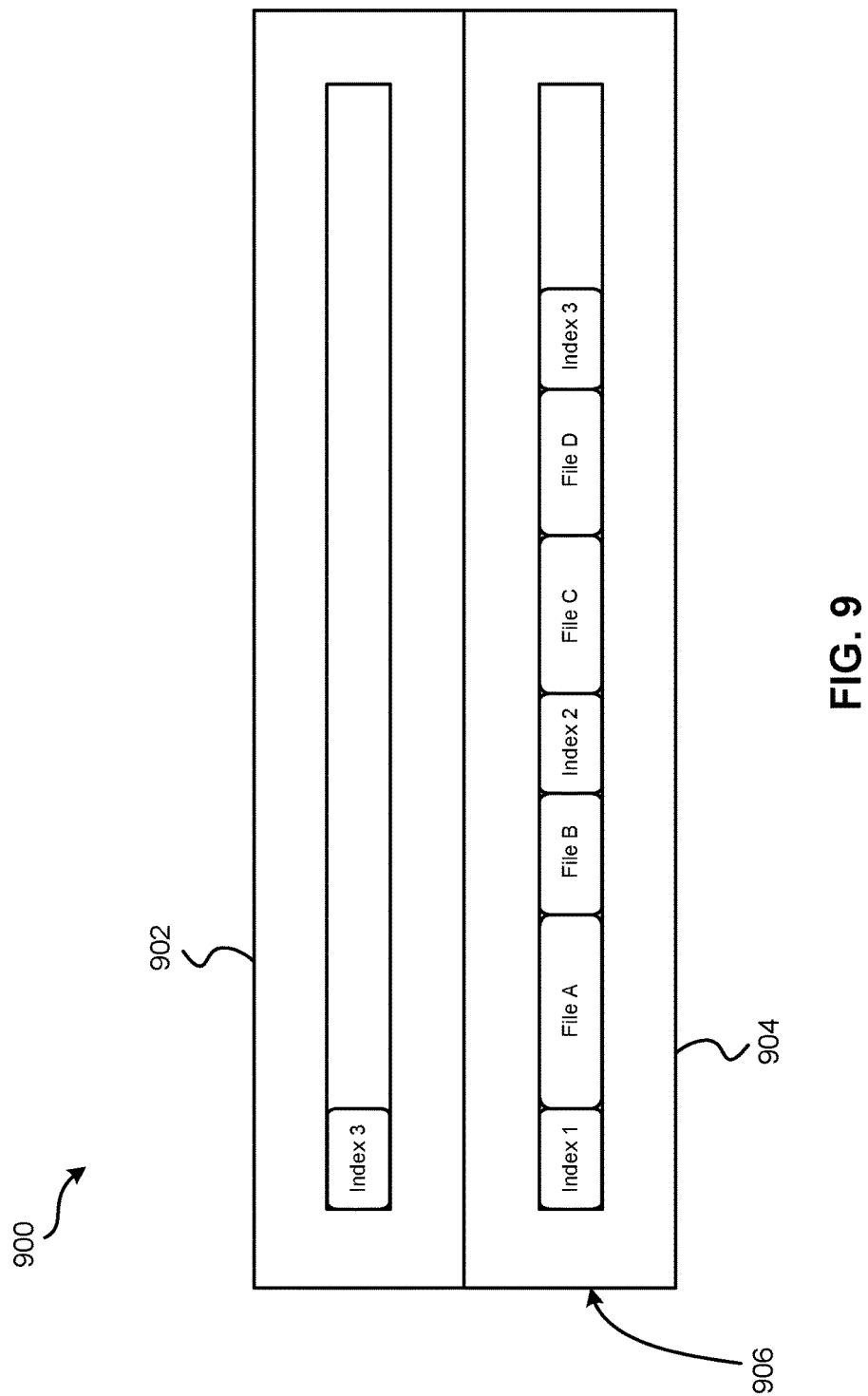
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 differently depending on the desired embodiment. According to some embodiments, the metadata of the index partition 902 may be updated in response to the tape being unmounted, e.g., such that the index may be read from the index partition when that tape is mounted again. The metadata may also be written in the data partition 902 so the tape may be mounted using the metadata recorded in the data partition 902, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As described above in FIGS. 8A-8C, tape tenting allows the tape to pass sufficiently close to the portion of the module having the magnetic transducers with a low error rate. It would be desirable to create tape tenting near the magnetic transducers without having to depend on proximity to an edge of the module to achieve the desired tenting above the transducers.

Embodiments described herein include an apparatus to reduce friction and scratching susceptibility in the sensor region of the head with tape tenting induced by novel means that induces tape tenting above the magnetic transducers but does not use an edge of the module as described in FIGS. 8A-8C.

Figure 10C:
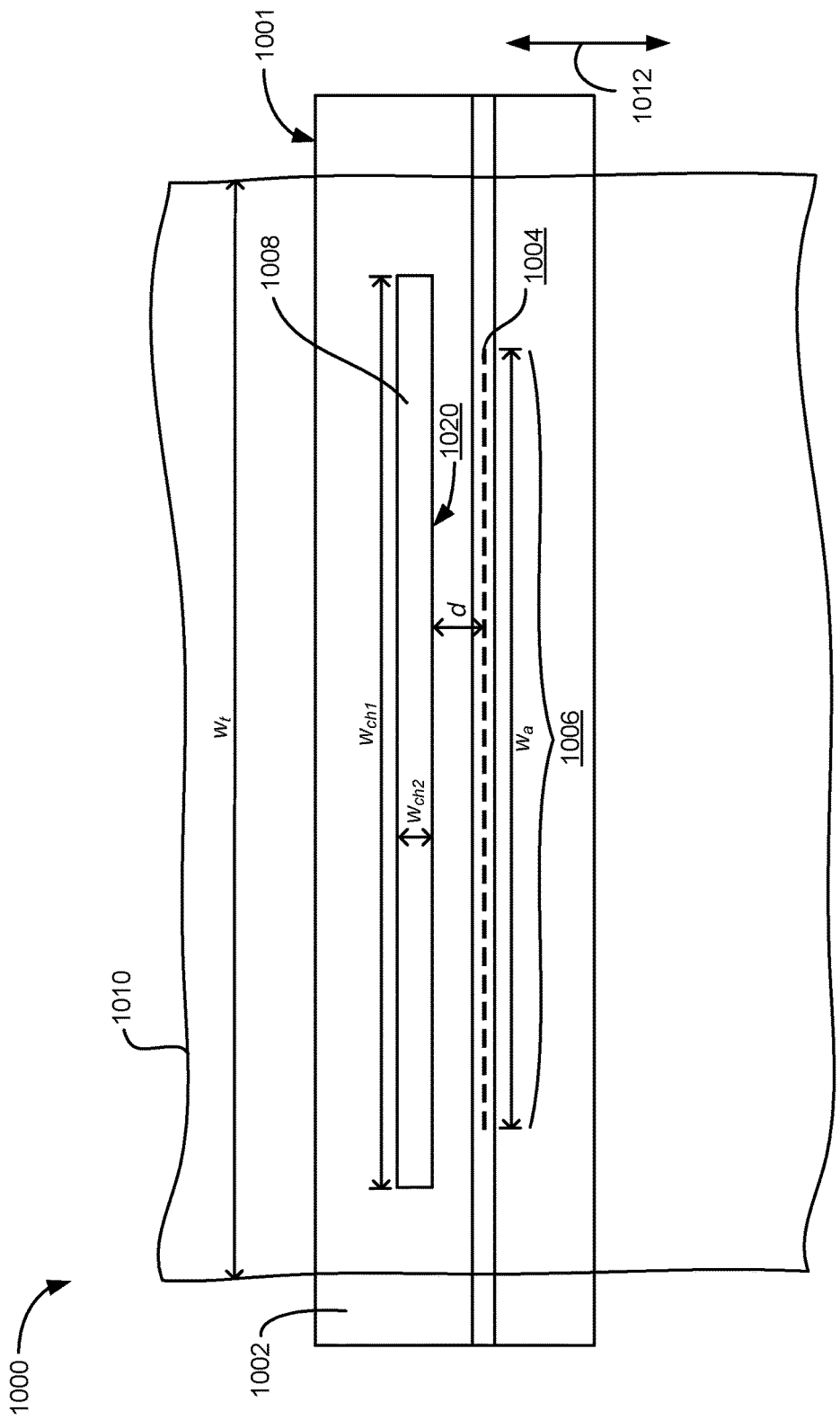
FIG. 10C is a tape bearing surface view of the magnetic tape head of FIG. 10A.

FIGS. 10A-10C depict an apparatus 1000, in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment.

According to one embodiment as shown in a perspective view in FIG. 10A, an apparatus 1000 includes a module 1001 having a tape bearing surface 1002, an array 1006 of magnetic transducers 1004, and a channel 1008 in the tape bearing surface 1002. The channel 1008 has a longitudinal axis 1014 that may be oriented about parallel to a longitudinal axis 1016 of the array 1006 of magnetic transducers 1004. In various embodiments, the tape bearing surface 1002 of the apparatus 1000 may be planar.

In some embodiments, the array 1006 of magnetic transducers 1004 may be write transducers. In other embodiments, the array 1006 of magnetic transducers 1004 may be read transducers.

Looking to the side view of the module 1001 in FIG. 10B, the channel 1008 may induce tenting 1018 of a moving magnetic recording tape 1010 above the array of magnetic transducers 1004. As the tape 1010 is in motion, as shown in FIG. 10B, the relative movement of the tape 1010 over the channel 1008 entrains air from the channel 1008, creating a sub-ambient air pressure in the channel 1008. As a result, atmospheric pressure above the tape urges the tape 1010 into the interior of the channel 1008, thereby creating tape tenting 1018 proximate to the channel edge 1020, and above the array 1006 of magnetic transducers 1004. This phenomenon occurs when the tape is moving in either tape travel direction 1012.

In one embodiment, the array 1006 of magnetic transducers 1004 may be positioned about under a peak (highest point) of a tent 1018 formed by the moving magnetic recording tape 1010. In another embodiment, the array 1006 of magnetic transducers 1004 may be positioned between the peak and the channel 1008. In yet another embodiment, the array 1006 of magnetic transducers 1004 may be positioned on an opposite side of the peak as the channel.

FIG. 10C depicts a top view of the module 1001 that shows the longitudinal axis of the channel 1008 may be oriented about parallel to the array 1006 of magnetic transducers 1004 where the direction 1012 of tape movement may pass from top to bottom of the figure, according to one embodiment. In various embodiments, the channel 1008 is preferably positioned such that a tape 1010 moving over the module covers the entire channel 1008 in all reading and writing positions. As shown in FIG. 10C, the first width $w_{ch1}$ of the channel 1008 along the longitudinal axis thereof may be wider than a width $w_a$ of the array 1006 of magnetic transducers 1004 along the longitudinal axis thereof.

In some embodiments, the first width $w_{ch1}$ of the channel may be less than a width $w_t$ of a tape 1010 for which the apparatus 1000 may be designed, e.g., as shown in FIG. 10C. Preferably, the first width $w_{ch1}$ of the channel at least approximately the width of a data band for which the module is designed.

In some approaches, the first width $w_{ch1}$ of the channel is less than a distance between servo sensors of the module, e.g., slightly less (e.g., the outer edges of the channel are within about 150 microns of the servo sensor closest thereto). Preferably, the first width $w_{ch1}$ of the channel is greater than the width of the span of data transducers in the array. Note that the array described herein may refer to only the data transducers, or may refer to the data and servo transducers. In another approach, the first width $w_{ch1}$ of the channel is slightly wider than the distance between the servo sensors, e.g., up to about 300 microns wider.

In various embodiments, a second width $w_{ch2}$ of the channel 1008 in the direction 1012 of tape motion may in part determine the extent of tenting of the moving magnetic tape 1010 as it passes over the channel edge 1020 of the channel 1008 (the trailing edge as the tape passes from top to bottom). In various embodiments, the extent of bending of the tape 1010 from the edge 1020 of the channel 1008 nearest the array 1006 may also depend on expected media parameters. Thus, the second width $w_{ch2}$ of the channel 1008 may be determined by parameters of the magnetic tape to be used with the tape head, for example, bending stiffness, etc.

In some embodiments, the second width $w_{ch2}$ of the channel 1008 in the direction 1012 of tape motion may be in a range of about 5 μm to about 100 μm. In one embodiment, the second width $w_{ch2}$ of the channel 1008 may be preferably about 25 μm.

In one embodiment of apparatus 1000 as shown in FIG. 10C, a distance d between the channel 1008 and the array 1006 of magnetic transducers 1004 along the tape bearing surface 1002 in a direction 1012 of tape travel may be in a range of about 5 μm to about 50 μm, but the distance d could be higher or lower, depending on the desired location of the tenting. Looking back to FIG. 10B, the value of the distance d (FIG. 10C) may be selected to ensure that the tenting 1018 of the moving tape 1010 induced by bending of the tape at the edge 1020 of the channel 1008 occurs above the array 1006 of magnetic transducers 1004. For example, but not limited to these examples, if the tape is relatively stiff, then the channel may induce a wider tent, thereby allowing the distance between the channel and the array of magnetic transducers to be made larger. If the tape is less stiff, then the channel may induce a narrower tent, whereby the distance between the channel and the array of magnetic transducers may be made smaller.

In some embodiments, the tenting 1018 of the moving magnetic tape 1010 induced by the tape moving over the channel 1008 may increase separation between the tape 1010 and the tape bearing surface 1002 of the module 1001, and particularly, increase separation between potential defects lodged in the tape 1010 and the tape bearing surface 1002. Furthermore, a negative curvature at the top of the tent 1018, as shown in FIG. 10B, may provide additional benefit such that the curvature may cause defects in the tape 1010 to retract from the tape bearing surface 1002 of the module 1001. In contrast, defects in media running over conventional heads tend to protrude from the tape and approach the tape bearing surface as the tape bends slightly into the recessed gap of the magnetic transducer and thereby increase the incidence of shorting when the defects drag across the tunnel barrier region.

In some approaches of the apparatus, a media facing side of the array of magnetic transducers may be recessed from the tape bearing surface.

One embodiment of apparatus 1000 may include a drive mechanism such as a motor or other known mechanism for passing a magnetic medium over the module 1001 and a controller electrically coupled to the array of magnetic transducers. For example, the motor or other known mechanism may drive a tape supply cartridge, e.g., tape supply cartridge 120 of FIG. 1A, and a take-up reel, e.g., take-up reel 121 also of FIG. 1A, of a drive in which the block is implemented in, to move the tape media over the block and/or other components of the drive.

Figure 11A:
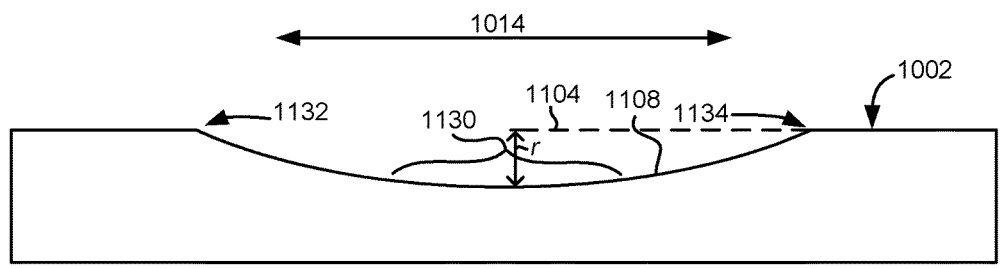
FIGS. 11A-11E are partial side views of a channel along the longitudinal axis thereof according to various embodiments.

According to various embodiments, the channel may have a middle region extending along the longitudinal axis of the channel, where the longitudinal axis extends between opposite edges of the channel that are farthest apart. Moreover, the middle region may be more recessed into the tape bearing surface than the edges. In one embodiment as shown in FIG. 11A, a cross-sectional profile of the channel 1108 may be arcuate, e.g., having a shape of a section of a circle. As shown, the channel 1108 may have a middle region 1130 extending along the longitudinal axis 1014 of the channel 1108 between opposite edges 1132, 1134 of the channel 1108. The middle region 1130 may be more recessed into the tape bearing surface 1002 than the edges 1132, 1134. In some embodiments, the tape may contact the bottom of the channel near the edges thereby helping smooth the edges to the beveled region.

Figure 11B:
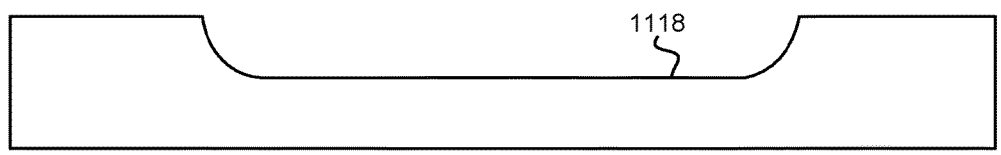

In another embodiment as shown in FIG. 11B, a cross-sectional profile of the channel 1118 may have a shape with a middle section of similar recession extended to curved opposite ends.

Figure 11C:
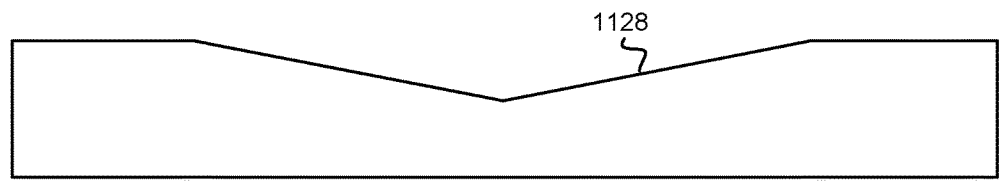

In yet another embodiment as shown in FIG. 11C, a cross-sectional profile of the channel 1128 may have a triangular shape with a middle section that may be more recessed than the opposite ends.

Figure 11D:
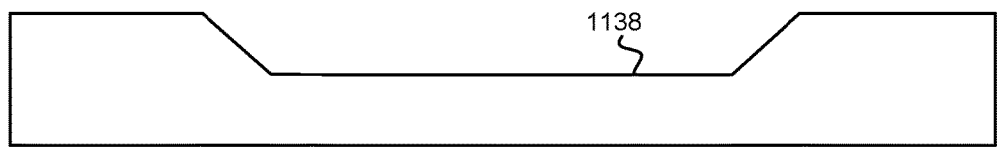

In yet another embodiment as shown in FIG. 11D, a cross-sectional profile of the channel 1138 may have a shape with a middle section of similar recession therealong between straight opposite ends.

Figure 11E:

In yet another embodiment as shown in FIG. 11E, a cross-sectional profile of the channel 1148 may have a shape with a middle section of similar recession therealong between vertical opposite sides.

The illustrations in FIGS. 11A-11E may represent a selection of possible embodiments and are not meant to be limiting to the embodiments described herein. Rather, the profile of the channel may be any suitable shape that would become apparent to one skilled in the art upon reading the present descriptions.

In various embodiments, as shown for example in FIG. 11A, a depth of recession r of the channel 1108 from the plane 1104 of the tape bearing surface 1002 to the furthest recessed portion, for example the middle region 1130, of the channel 1008 may be in a range of about 2 μm to about 5 μm or more.

Figure 12:
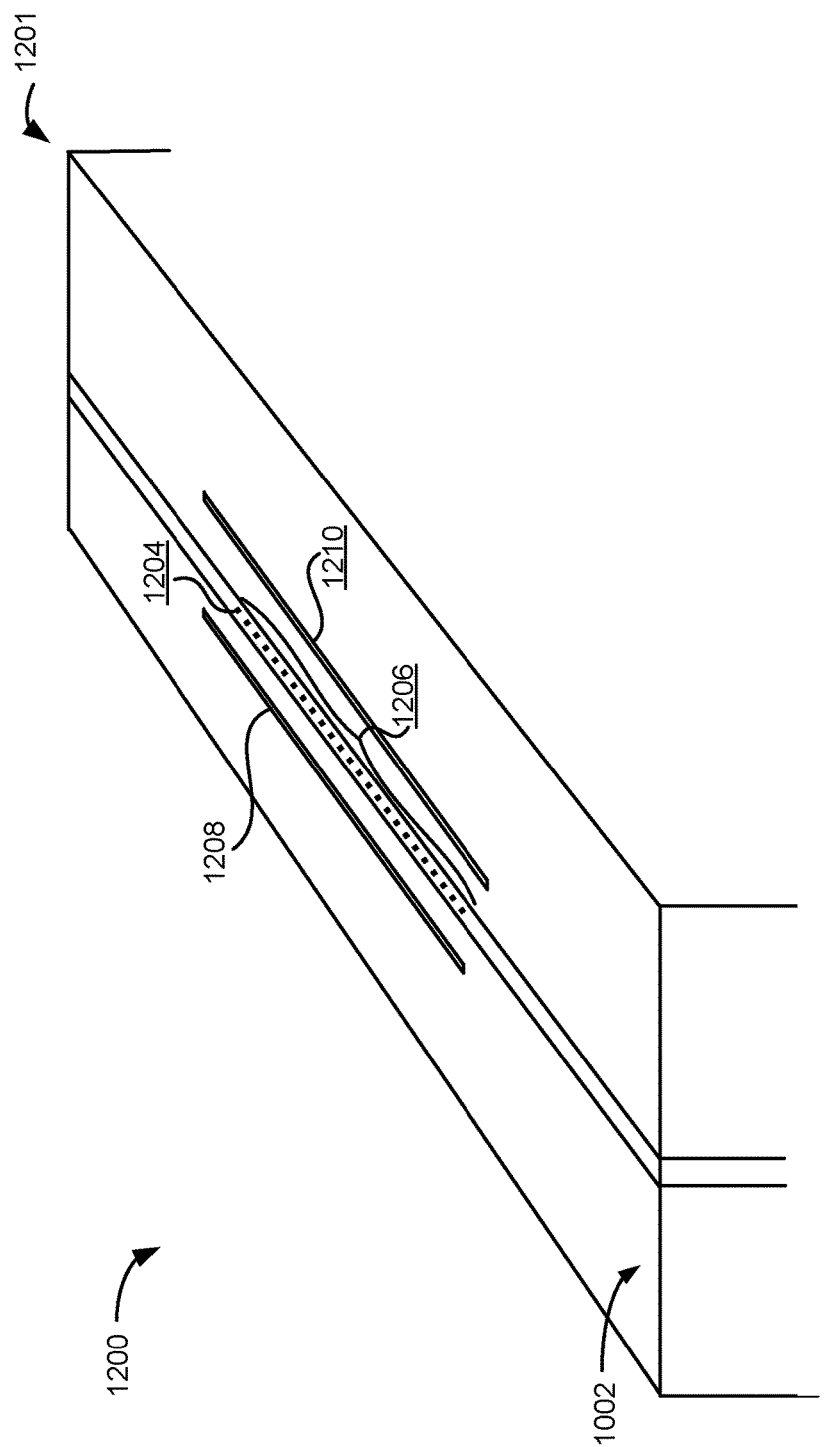
FIG. 12 is a perspective view of a magnetic tape head according to one embodiment.

FIG. 12 depicts an apparatus 1200, in accordance with one embodiment. As an option, the present apparatus 1200 may be implemented in conjunction with features from any other embodiment listed herein, such as those described with reference to the other FIGS. Of course, however, such apparatus 1200 and others presented herein may be used in various applications and/or in permutations which may or may not be specifically described in the illustrative embodiments listed herein. Further, the apparatus 1200 presented herein may be used in any desired environment.

In one embodiment as shown in FIG. 12, an apparatus 1200 includes a module 1201 having a tape bearing surface 1002, an array 1206 of magnetic transducers 1204, a first channel 1208 having a longitudinal axis oriented about parallel to a longitudinal axis of the array 1206 of magnetic transducers 1204. for inducing tenting of a moving magnetic recording tape above the array of magnetic transducers. Moreover, the apparatus 1200 includes a second channel 1210 having a longitudinal axis oriented about parallel to a longitudinal axis of the array 1206 of magnetic transducers 1204 for inducing tenting of a moving magnetic recording tape above the array of magnetic transducers. According to an embodiment of apparatus 1200, the first channel 1208 and the second channel 1210 may be positioned on opposite sides of the array 1206 of transducers 1204.

Figure 13:
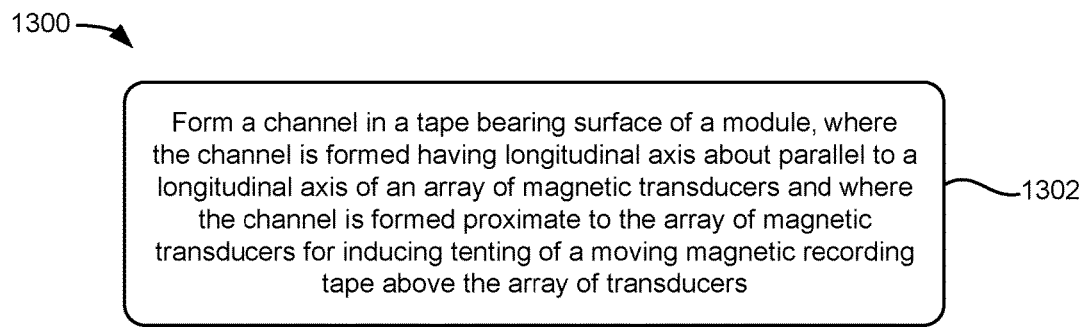
FIG. 13 is a flowchart of a method according to one embodiment.

FIG. 13 depicts a method 1300 for forming a channel in a tape bearing surface of a module, in accordance with one embodiment. As an option, the present method 1300 may be implemented in conjunction with features from any other embodiment listed herein, such as those described with reference to the other FIGS. Of course, however, such method 1300 and others presented herein may be used in various applications and/or in permutations which may or may not be specifically described in the illustrative embodiments listed herein. Further, the method 1300 presented herein may be used in any desired environment.

In one embodiment as shown in FIG. 13, a method 1300 begins with step 1302 involving forming a channel in a tape bearing surface of a module, where the channel may be formed having a longitudinal axis about parallel to a longitudinal axis of an array of magnetic transducers. Moreover, the channel may be formed proximate to the array of magnetic transducers for inducing tenting of a moving magnetic recording tape above the array of transducers.

In one embodiment of step 1302 of method 1300, the channel may be formed as a shape that has a middle region extending along the longitudinal axis of the channel between opposite edges of the channel, where the middle region may be more recessed into the tape bearing surface than the edges. Any suitable technique for forming the channel may be used. In some approaches, the channel may be formed by plunge cutting with a diamond circular saw. In other approaches, the channel may be formed by milling using conventional techniques and further processed using known techniques that provide edge blending, for example, micro-opto-mechanical (MOEM) optical processing, ion etching, etc. In yet other approaches, laser ablation may be used.

In various embodiments of step 1302 of method 1300 the width of the channel along the longitudinal axis may be in a range of about 5 μm to about 100 μm. In a preferred embodiment of method 1300, the width of the channel along the longitudinal axis may be about 25 μm.

In some embodiments of step 1302 of method 1300, a depth of recession of the channel may be in a range of about 2 μm to about 5 μm or more.

In some embodiments of step 1302 of method 1300, a distance between the channel and the array of magnetic transducers along the tape bearing surface in a direction of tape travel may be in a range of about 5 μm to about 50 μm, but the distance could be higher or lower, depending on expected media parameters.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a module having a tape bearing surface, an array of magnetic transducers, and a channel in the tape bearing surface,
   the channel having a longitudinal axis oriented about parallel to a longitudinal axis of the array of magnetic transducers for inducing tenting of a moving magnetic recording tape above the array of magnetic transducers,
   wherein the channel has a middle region extending along the longitudinal axis of the channel between opposite edges of the channel, wherein the middle region is more recessed into the tape bearing surface than the edges.

2. An apparatus as recited in claim 1, wherein a first width of the channel along the longitudinal axis thereof is wider than a width of the array of magnetic transducers along a longitudinal axis of the array of magnetic transducers.

3. An apparatus as recited in claim 2, wherein the first width of the channel along the longitudinal axis thereof is less than a width of a tape for which the apparatus is designed.

4. An apparatus as recited in claim 1, wherein a second width of the channel in a direction of tape motion is in a range of about 5 microns to about 100 microns.

5. An apparatus as recited in claim 1, wherein a depth of the channel is in a range of about 2 microns to about 5 microns.

6. An apparatus as recited in claim 1, wherein a distance between the channel and the array of magnetic transducers along the tape bearing surface in a direction of tape travel is in a range of about 5 microns to about 50 microns.

7. An apparatus as recited in claim 1, wherein the channel is configured to induce a sub-ambient pressure in the channel upon a relative movement of the moving magnetic recording tape over the channel, thereby resulting in the tenting of the moving magnetic recording tape above the array of magnetic transducers.

8. An apparatus as recited in claim 1, wherein the array of magnetic transducers is positioned about under a peak of a tent formed by the moving magnetic recording tape.

9. An apparatus as recited in claim 1, wherein the tape bearing surface is planar.

10. An apparatus as recited in claim 1, wherein the array of magnetic transducers is an array of read transducers.

11. An apparatus as recited in claim 1, further comprising:
a drive mechanism for passing a magnetic medium over the module; and
a controller electrically coupled to the array of magnetic transducers.

12. An apparatus comprising:
a module having a tape bearing surface, an array of magnetic transducers, and a channel in the tape bearing surface,
the channel having a longitudinal axis oriented about parallel to a longitudinal axis of the array of magnetic transducers for inducing tenting of a moving magnetic recording tape above the array of magnetic transducers,
wherein the channel is arcuate.

13. A method, comprising:
forming a channel in a tape bearing surface of a module, wherein the channel is formed having a longitudinal axis about parallel to a longitudinal axis of an array of magnetic transducers,
wherein the channel is formed proximate to the array of magnetic transducers for inducing tenting of a moving magnetic recording tape above the array of magnetic transducers,
wherein the channel is formed as a shape that has a middle region extending along the longitudinal axis of the channel between opposite edges of the channel, wherein the middle region is more recessed into the tape bearing surface than ends of the channel adjacent the edges.

14. A method as recited in claim 13, wherein the channel is formed by milling.

15. A method as recited in claim 13, wherein a width of the channel along the longitudinal axis is in a range of about 5 microns to about 100 microns.

16. A method as recited in claim 13, wherein a depth of the channel is in a range of about 2 microns to about 5 microns.

17. A method as recited in claim 13, wherein a distance between the channel and the array of magnetic transducers along the tape bearing surface in a direction of tape travel is in a range of about 5 microns to about 50 microns.

* * * * *